(12) United States Patent
Sano et al.

(10) Patent No.: US 12,240,412 B2
(45) Date of Patent: Mar. 4, 2025

(54) WEBBING WINDING DEVICE

(71) Applicant: KABUSHIKI KAISHA TOKAI-RIKA-DENKI-SEISAKUSHO, Aichi (JP)

(72) Inventors: Chihiro Sano, Aichi (JP); Kazuhiro Yamada, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 307 days.

(21) Appl. No.: 17/909,952

(22) PCT Filed: Jan. 12, 2021

(86) PCT No.: PCT/JP2021/000716
§ 371 (c)(1),
(2) Date: Sep. 7, 2022

(87) PCT Pub. No.: WO2021/192493
PCT Pub. Date: Sep. 30, 2021

(65) Prior Publication Data
US 2023/0114622 A1 Apr. 13, 2023

(30) Foreign Application Priority Data
Mar. 26, 2020 (JP) .................. 2020-056844

(51) Int. Cl.
*B60R 22/36* (2006.01)
*B60R 22/343* (2006.01)

(52) U.S. Cl.
CPC ............ *B60R 22/36* (2013.01); *B60R 22/343* (2013.01)

(58) Field of Classification Search
CPC .... B60R 22/36; B60R 22/343; B60R 22/3416
See application file for complete search history.

(56) References Cited

U.S. PATENT DOCUMENTS 6,332,629 B1 * 12/2001 Midorikawa ....... B60R 22/3416
242/390.8
6,616,186 B1 * 9/2003 Midorikawa ..... B60R 21/01546
280/801.1
(Continued)

FOREIGN PATENT DOCUMENTS

| CN | 1532096 A | 9/2004 |
| JP | 2002-002447 A | 1/2002 |
| JP | 2021-123292 A | 8/2021 |

*Primary Examiner* — Sang K Kim
(74) *Attorney, Agent, or Firm* — Studebaker & Brackett PC

(57) ABSTRACT

A webbing winding device includes a spool, a sensor lever, a solenoid, and a controller. In a state where the sensor lever is disposed at the first position, the rotation in the drawing-out direction of the spool is enabled, and in a state where the sensor lever is disposed at the second position, the rotation in the drawing-out direction of the spool is locked. When the solenoid is actuated, a part of the sensor lever is attracted and the sensor lever is displaced from the first position to the second position. The controller adjusts the attracting force by which the solenoid attracts a part of the sensor lever. The controller adjusts the attracting force after completion of displacement to the second position of the sensor lever to an attracting force weaker than the attracting force F at the time of completion of displacement to the second position.

3 Claims, 6 Drawing Sheets

(56) References Cited

U.S. PATENT DOCUMENTS

2001/0030255 A1    10/2001  Peter
2004/0108155 A1*   6/2004  Mori ................... B60R 22/44
                                                               280/806
2004/0195420 A1    10/2004  Schnabl
2016/0347276 A1*  12/2016  Yanagawa ......... B60R 22/3413
2018/0265033 A1*   9/2018  Jaradi ................ B60R 22/343

\* cited by examiner

WEBBING WINDING DEVICE

TECHNICAL FIELD

The present invention relates to a webbing winding device.

BACKGROUND ART

Japanese Patent Application Laid-Open (JP-A) No. 2002-2447 discloses a webbing winding device including a lock mechanism that restricts drawing-out from a spool of a webbing (belt) in emergency of a vehicle, such as at the time of rapid deceleration of a vehicle. In the lock mechanism of the webbing winding device described in this document, a locking pawl is engaged with a gear member provided integrally rotatably with the spool. Accordingly, rotation of the gear member is locked and drawing-out from the spool of the webbing is restricted. In the lock mechanism of the webbing winding device described in this document, the locking pawl is displaced toward the gear member by the solenoid being actuated.

SUMMARY OF INVENTION

Technical Problem

Incidentally, in the configuration in which the displacement member such as the locking pawl is displaced by the actuation of the actuation portion such as the solenoid, it is desirable to be able to prevent the displacement member from being difficult to displace toward the original position after the actuation of the actuation portion, for example.

In consideration of the above fact, an object of the present invention is to obtain a webbing winding device capable of preventing it from being difficult to displace the displacement member toward the original position.

Solution to Problem

A webbing winding device according to a first aspect includes: a spool, a webbing to be attached to an occupant being wound around the spool, and the spool being rotated in a drawing-out direction by the webbing being drawn out; a displacement member configured to be displaced between a first position and a second position, rotation in the drawing-out direction of the spool being enabled in a state in which the displacement member is disposed at the first position, and rotation in the drawing-out direction of the spool being locked in a state in which the displacement member is disposed at the second position; an actuation portion, actuation of the actuation portion causing a part of the displacement member to be attracted to cause the displacement member to be displaced from the first position to the second position; and a controller configured to adjust an attracting force by which the actuation portion attracts the part of the displacement member, the controller configured to adjust the attracting force after completion of displacement to the second position of the displacement member to an attracting force that is weaker than an attracting force at a time of completion of displacement to the second position of the displacement member.

In the webbing winding device according to the first aspect, a webbing winding device according to a second aspect further includes a main lock that is displaced after completion of displacement to the second position of the displacement member, thereby causing locking of rotation in the drawing-out direction of the spool to be started. After start of locking of rotation in the drawing-out direction of the spool, the controller adjusts the attracting force to an attracting force that is weaker than an attracting force at a time of completion of displacement to the second position of the displacement member.

Advantageous Effects of Invention

In the webbing winding device according to the first aspect, when the actuation portion is actuated by the controller in an emergency of the vehicle, a part of the displacement member is attracted to the actuation portion. Accordingly, the displacement member is displaced from the first position to the second position, and the rotation in the drawing-out direction of the spool is locked. As a result, drawing-out from the spool of the webbing is restricted. Here, in the webbing winding device according to the first aspect, the attracting force by which the actuation portion attracts a part of the displacement member is adjusted by the controller. Then, the controller adjusts the attracting force after completion of displacement to the second position of the displacement member to an attracting force weaker than the attracting force at the time of completion of displacement to the second position of the displacement member. Accordingly, it is possible to prevent the displacement toward the first position of the displacement member after completion of displacement to the second position of the displacement member from being hindered by the attracting force by the actuation portion.

In the webbing winding device according to the second aspect, when the main lock is displaced after completion of displacement to the second position of the displacement member, the locking of the rotation in the drawing-out direction of the spool is started.

Here, in the webbing winding device according to the second aspect, the controller adjusts the attracting force of the actuation portion to an attracting force weaker than the attracting at the time of completion of displacement to the second position of the displacement member after the start of locking of the rotation in the drawing-out direction of the spool. Accordingly, it is possible to prevent the displacement toward the first position of the displacement member after the start of locking of the rotation in the drawing-out direction of the spool from being hindered by the attracting force by the actuation portion.

DESCRIPTION OF EMBODIMENTS

A webbing winding device according to an embodiment of the present invention will be described with reference to FIGS. 1 to 4.

Figure 1:
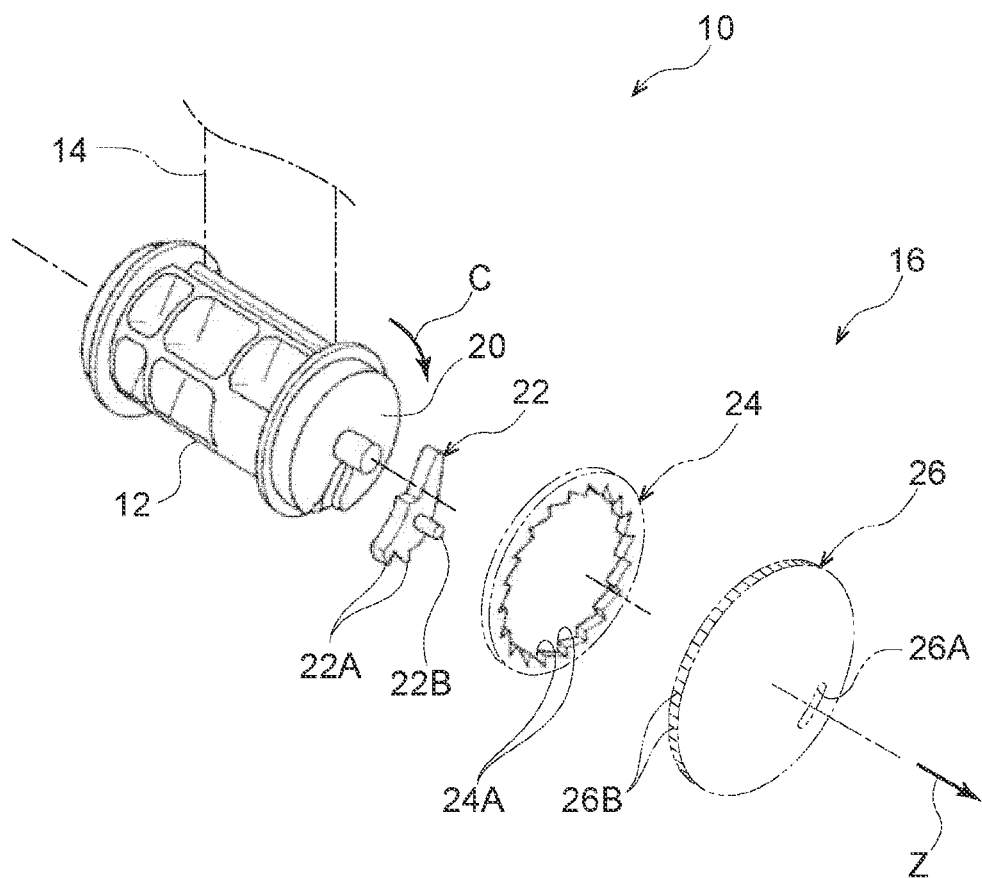
FIG. 1 is an exploded perspective view showing a spool, a main lock, and the like constituting a part of a webbing winding device.
Figure 2:
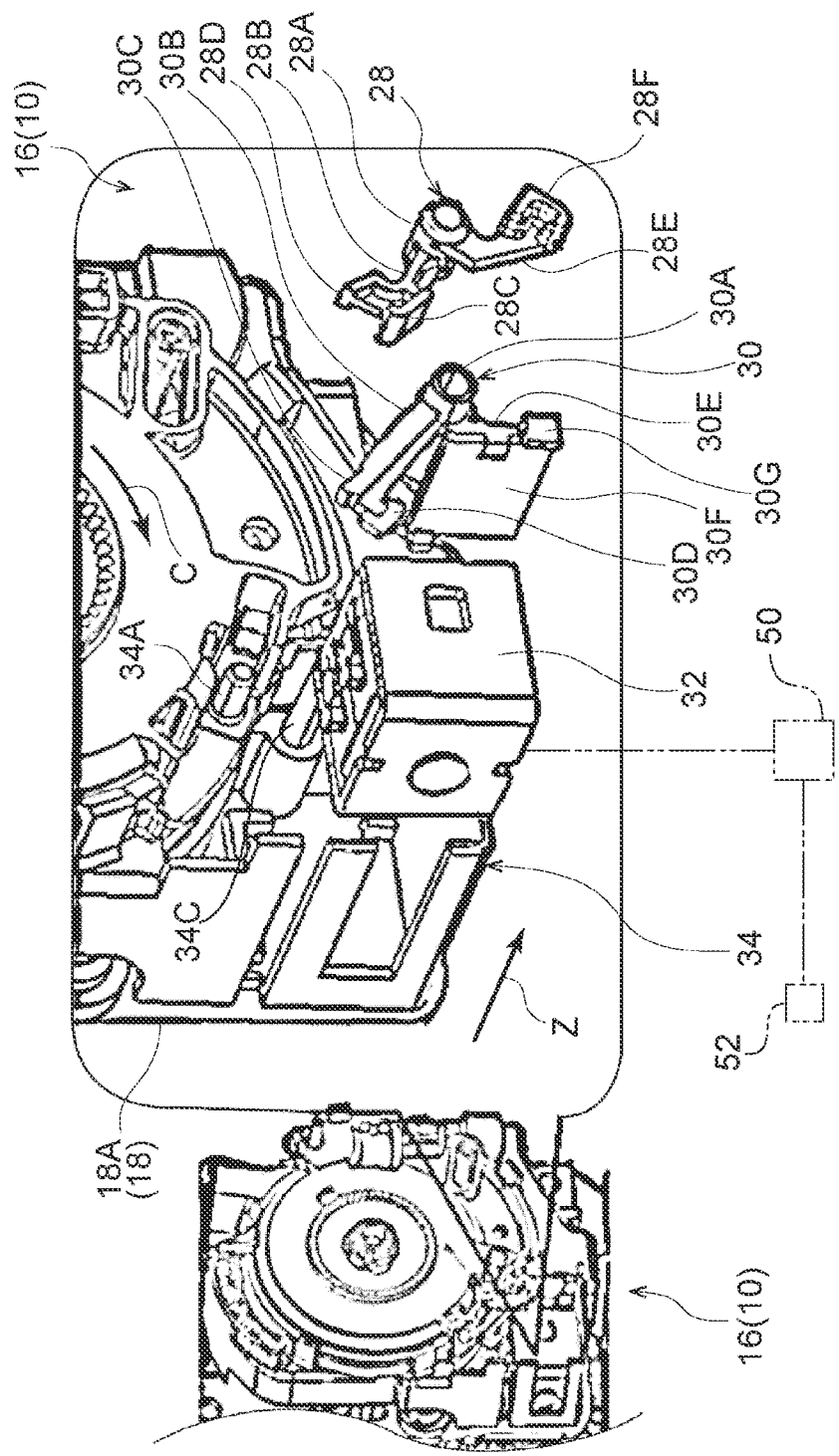
FIG. 2 is an exploded perspective view showing a solenoid, a sensor lever, a pawl, and the like constituting a part of a lock mechanism.

As shown in FIGS. 1 and 2, the webbing winding device 10 of the present embodiment includes a spool 12, a webbing 14, a lock mechanism 16, and a controller 50. Hereinafter, unless otherwise noted, when the axial direction, the radial direction, and the circumferential direction are simply indicated, the rotational axial direction, the rotational radial direction, and the rotational circumferential direction of the spool 12 are indicated.

As shown in FIG. 1, the spool 12 is formed in a substantially cylindrical shape. Between a pair of leg pieces 18A of a frame 18 (see FIG. 2), the spool 12 is rotatably supported by the frame 18. A known torsion shaft (not shown) constituting a force limiter mechanism is disposed inside the spool 12. A lock base 20 is provided on one side in the axial direction (arrow Z direction side) of the spool 12. The lock base 20 is coupled to the spool 12 through the torsion shaft. The spool 12 is rotationally urged in the winding direction by a winding urging mechanism (not shown).

The webbing 14 is attached to the body of an occupant seated on a vehicle seat, and has a base end portion, which is one end portion in the longitudinal direction, locked to the spool 12. The spool 12 is rotationally urged in a winding direction (direction of an arrow C in FIG. 1 and the like) being one rotation direction by an urging force of a spiral spring constituting a part of a winding urging mechanism. Then, the spool 12 is rotated in the winding direction, whereby the webbing 14 is wound around the spool 12 from the base end side. The webbing 14 is drawn out from the spool 12, whereby the spool 12 is rotated in a drawing-out direction (direction opposite to the arrow C in FIG. 1 and the like) being the other rotation direction. A winding mechanism such as a pretensioner mechanism that rotates the spool 12 in the winding direction in an emergency or the like of the vehicle described below may be provided.

Next, the lock mechanism 16 of the main part of the present embodiment will be described.

Figure 3:
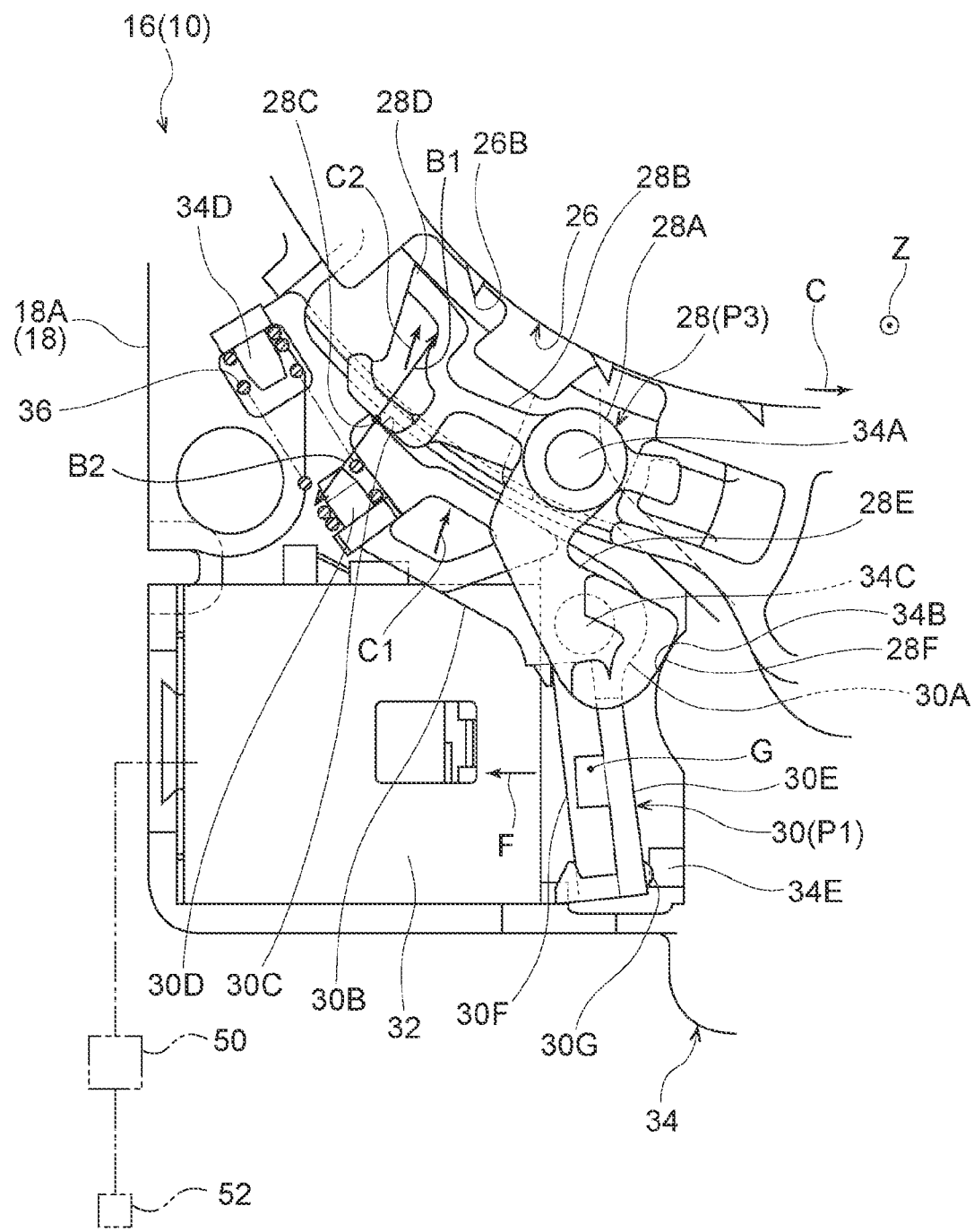
FIG. 3 is a side view showing a solenoid, a sensor lever, a pawl, and the like constituting a part of the lock mechanism, and shows a state in which the solenoid is stopped.

As shown in FIG. 1, the lock mechanism 16 includes a main lock 22 supported by the lock base 20 and a main lock engagement portion 24 with which the main lock 22 is engaged. The lock mechanism 16 includes a pawl engagement member 26 provided to be integrally rotatable with the spool 12. As shown in FIGS. 2 and 3, the lock mechanism 16 includes a pawl 28 and a sensor lever 30 disposed radially outside the pawl engagement member 26, and a solenoid 32 disposed to face the sensor lever 30.

As shown in FIG. 1, the main lock 22 is formed in a substantially rectangular block shape. The base end side of the main lock 22 is supported in a tiltable manner by a main lock support portion provided on the lock base 20. On the radially outer side on the tip side of the main lock 22, a main lock engaging tooth 22A to be engaged with a main lock tooth to be engaged 24A of the main lock engagement portion 24 described below is formed. Then, the main lock 22 is tilted (displaced) radially outward with the main lock support portion as a supporting shaft portion, whereby the main lock engaging tooth 22A is engaged with the main lock tooth to be engaged 24A of the main lock engagement portion 24. The main lock 22 is provided with a cylindrical protrusion 22B protruding toward one side in the axial direction.

The main lock engagement portion 24 is formed in an annular shape as an example, and a plurality of main lock tooth to be engaged 24A (ratchet teeth) are formed along the circumferential direction in the inner circumferential portion of the main lock engagement portion 24. The main lock engagement portion 24 may be formed integrally with the frame 18 (see FIG. 2) that supports the spool 12, or may be provided separately from the frame 18.

The pawl engagement member 26 is formed in a disc shape. A radially central portion of the pawl engagement member 26 is rotatably supported by a torsion shaft (not shown) or a lock base 20. On the radially outer side of the portion supported by the torsion shaft (not shown) or the lock base 20 in the pawl engagement member 26, a long hole-shaped actuation groove 26A in which the protrusion 22B of the main lock 22 is disposed inside is formed. A plurality of pawl tooth to be engaged 26B (ratchet teeth) with which a pawl engaging tooth 28D of the pawl 28 described below is engaged are formed along the circumferential direction in the outer circumferential portion of the pawl engagement member 26. The above-described pawl engagement member 26 is rotationally urged in the drawing-out direction with respect to the lock base 20 by a coil spring (not shown) provided between the pawl engagement member 26 and the lock base 20, and has the rotation by the coil spring in the drawing-out direction with respect to the lock base 20 locked.

As shown in FIG. 2, the pawl 28 is supported in a tiltable (rotationally displaceable) manner by the housing 34. The housing 34 is attached to the frame 18. A main lock engagement portion 24, a main lock 22, and the like (see FIG. 1) are disposed inside the housing 34.

The pawl 28 includes a tubular portion 28A that is rotatable around a cylindrical first supporting shaft portion 34A that is provided in the housing 34, by inserting the first supporting shaft portion 34A. The pawl 28 includes a first arm portion 28B that protrudes from the other side in the axial direction (side opposite to the direction of arrow Z) of the tubular portion 28A toward the outer side in the radial direction of the tubular portion 28A. A pawl first abutting portion 28C on which a part of the first arm portion 30B abuts is formed on the first arm portion 30B side of the sensor lever 30 described below in the tip portion of the first arm portion 28B. On the side opposite to the pawl first abutting portion 28C in the tip portion of the first arm portion 28B, a pawl engaging tooth 28D to be engaged with a pawl tooth to be engaged 26B (see FIG. 3) of the pawl engagement member 26 is formed. The pawl 28 further includes a second arm portion 28E that protrudes from one axial side (arrow Z direction side) of the tubular portion 28A toward the radially outer side of the tubular portion 28A and the side opposite to the direction in which the first arm portion 28B protrudes. A pawl second abutting portion 28F which abuts on the housing first abutting portion 34B (see FIG. 3) of the housing 34 is formed in a tip portion of the second arm portion 28E.

The sensor lever 30, as a displacement member, includes a tubular portion 30A that is rotatable around a cylindrical second support shaft portion 34C that is provided in the housing 34, by inserting the second support shaft portion 34C. The sensor lever 30 includes a first arm portion 30B that protrudes from one side in the axial direction (arrow Z direction side) of the tubular portion 30A toward the outer side in the radial direction of the tubular portion 30A. On the pawl first abutting portion 28C side of the first arm portion 28B of the pawl 28 in the tip portion of the first arm portion 30B, a sensor lever first abutting portion 30C as an engagement portion abutting on the pawl first abutting portion 28C is formed. As shown in FIG. 3, a sensor lever-side spring locking portion 30D to which an end portion on one side of the return spring 36 is locked is formed on the side opposite to the sensor lever first abutting portion 30C in the tip portion of the first arm portion 30B. An end portion on the other side of the return spring 36 is locked to a housing-side spring locking portion 34D provided in the housing 34. Then, the return spring 36 is deformed along with the tilt of the sensor lever 30 (tilt toward a second position P2 described below), whereby the sensor lever 30 is urged toward a first position P1 described below.

As shown in FIG. 2, the sensor lever 30 includes a second arm portion 30E as an attracting portion that protrudes from the tubular portion 30A toward the radially outer side of the tubular portion 30A and the side opposite to the direction in which the first arm portion 30B protrudes. A plate 30F made of metal (for example, iron or steel) and formed in a rectangular plate shape is fixed to the solenoid 32 side described below in the second arm portion 30E. The plate 30F may be embedded inside the second arm portion 30E. As shown in FIG. 3, a sensor lever second abutting portion 30G abutting on the housing second abutting portion 34E of the housing 34 is formed in the tip portion of the second arm portion 30E and on one side in the axial direction (arrow Z direction side).

The solenoid 32 as an actuation portion generates a magnetic field when applied with a predetermined voltage and energized (actuated). As an example, the solenoid 32 is configured by winding a conducting wire around an iron core (a coil is formed around the iron core).

Then, as shown in FIG. 3, in a state where the solenoid 32 is not energized (the solenoid 32 is not actuated), the sensor lever 30 takes a predetermined attitude with respect to the housing 34. The position of the sensor lever 30 in this state is referred to as a first position P1. In a state where the sensor lever 30 is disposed at the first position P1, a state where the sensor lever first abutting portion 30C of the sensor lever 30 abuts on the pawl first abutting portion 28C of the pawl 28, and a state where the pawl second abutting portion 28F of the pawl 28 abuts on the housing first abutting portion 34B of the housing 34 are brought about, so that the pawl 28 takes a predetermined attitude with respect to the housing 34. The position of the pawl 28 in this state is referred to as an engagement-release position P3. In the state where the pawl 28 is positioned at the engagement-release position P3, the pawl engaging tooth 28D of the pawl 28 cannot engage with the pawl tooth to be engaged 26B of the pawl engagement member 26 (is separated from each other).

Figure 4:
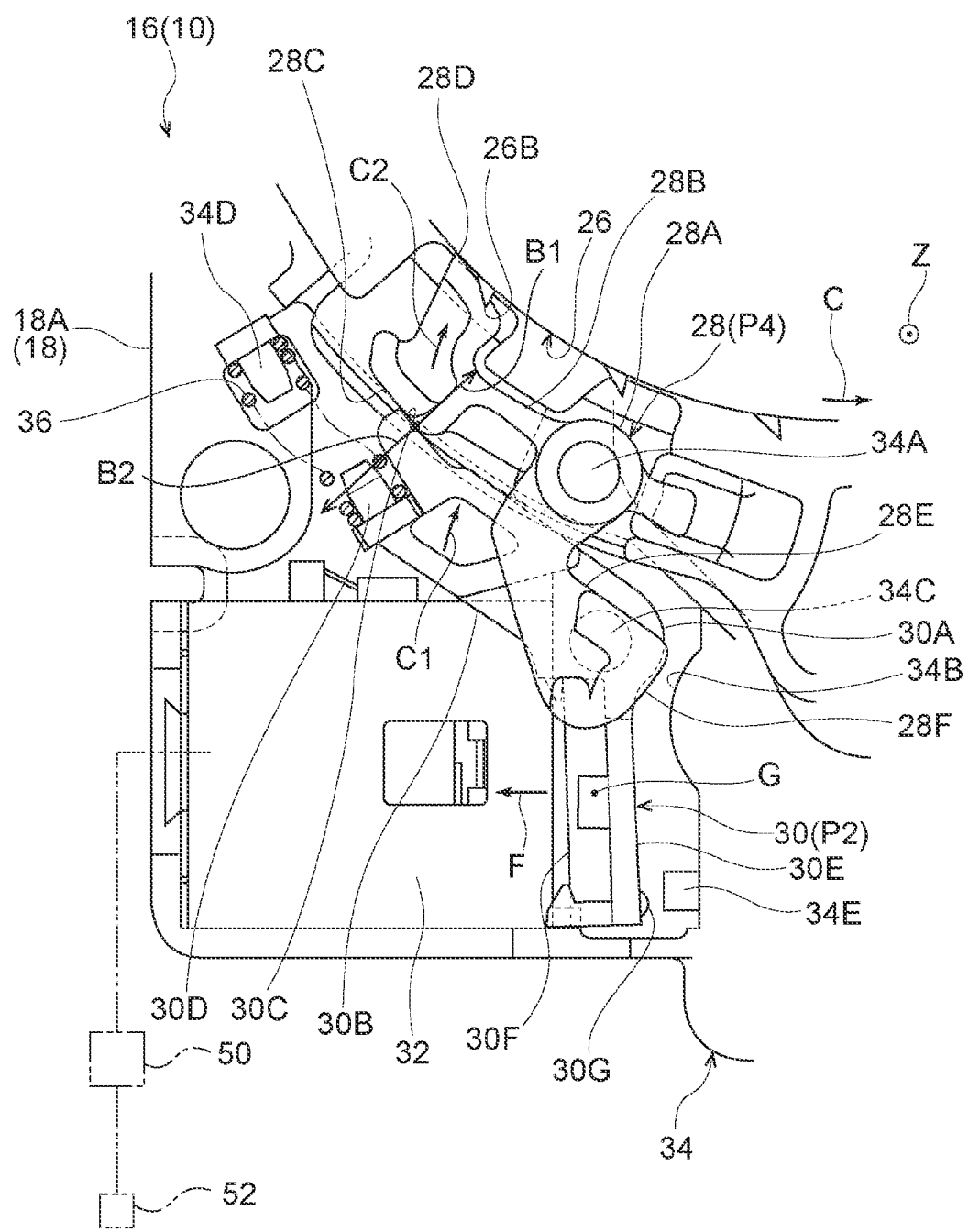
FIG. 4 is a side view showing a solenoid, a sensor lever, a pawl, and the like constituting a part of the lock mechanism, and shows a state in which the solenoid is actuated.

On the other hand, as shown in FIG. 4, when the solenoid 32 is actuated, the second arm portion 30E (plate 30F) of the sensor lever 30 is attracted to the solenoid 32, and the sensor lever 30 is tilted from the first position P1 to one side (arrow C1 direction side) around the second supporting shaft portion 34C. When the sensor lever 30 is tilted from the first position P1 to one side (arrow C1 direction side) around the second supporting shaft portion 34C, the sensor lever first abutting portion 30C of the first arm portion 30B of the sensor lever 30 presses the pawl first abutting portion 28C of the pawl 28. Accordingly, the pawl 28 is tilted from the engagement-release position P3 toward one side (arrow C2 direction side) around the first supporting shaft portion 34A, and the pawl engaging tooth 28D of the pawl 28 is engaged with the pawl tooth to be engaged 26B of the pawl engagement member 26. As a result, the rotation in the drawing-out direction (the drawing-out direction of the spool 12) of the pawl engagement member 26 is restricted (regulated). The position of the pawl 28 in a state where the pawl engaging tooth 28D of the pawl 28 can engage with the pawl tooth to be engaged 26B of the pawl engagement member 26 is referred to as an engaging position P4. The position of the sensor lever 30 in the state where the pawl 28 is positioned at the engaging position P4 is referred to as a second position P2.

The direction and magnitude of the attracting force by which the solenoid 32 attracts the second arm portion 30E (plate 30F) of the sensor lever 30 are indicated by an arrow F. The attracting force F is assumed to coincide with the direction from the N pole to the S pole or the direction from the S pole to the N pole which are the directions of the magnetic field generated by the solenoid 32.

The controller 50 is a vehicle ECU or the like that actuates the solenoid 32 based on information from various sensors provided in the vehicle. As an example, the controller 50 of the present embodiment actuates the solenoid 32 based on information from the acceleration sensor 52 provided in the vehicle. The acceleration sensor 52 is fixed to the vehicle at a position and in an attitude capable of detecting deceleration/acceleration of the vehicle.

Functions and Effects of Present Embodiment

Next, functions and effects of the present embodiment will be described.

As shown in FIG. 1, according to the webbing winding device 10 of the present embodiment, the webbing 14 is drawn out from the spool 12, whereby the webbing 14 is attached to the occupant seated on the vehicle seat.

Here, when an acceleration sensor 52 provided in the vehicle detects that the deceleration/acceleration of the vehicle including the webbing winding device 10 of the present embodiment exceeds the predetermined deceleration/acceleration (in an emergency or the like of the vehicle), the solenoid 32 is actuated by the controller 50 as shown in FIG. 4. When the solenoid 32 is actuated, the second arm portion 30E (plate 30F) of the sensor lever 30 is attracted to the solenoid 32, and the sensor lever 30 is tilted from the first position P1 to the second position P2. When the sensor lever 30 is tilted from the first position P1 to the second position P2, the sensor lever first abutting portion 30C of the first arm portion 30B of the sensor lever 30 presses the pawl first abutting portion 28C of the pawl 28. Accordingly, the pawl 28 is tilted from the engagement-release position P3 toward the engaging position P4, and the pawl engaging tooth 28D of the pawl 28 is engaged with the pawl tooth to be engaged 26B of the pawl engagement member 26. As a result, the rotation in the drawing-out direction (the drawing-out direction of the spool 12) of the pawl engagement member 26 is restricted.

Then, as shown in FIGS. 1 and 4, when the body of the occupant seated on the vehicle seat moves to the seat front side due to the deceleration of the vehicle and the webbing 14 is drawn out from the spool 12, the spool 12 is rotated in the drawing-out direction together with the main lock 22. Accordingly, the protrusion 22B of the main lock 24 is moved along the actuation groove 26A of the pawl engagement member 26 whose rotation is restricted, and the main lock engaging tooth 22A of the main lock 22 is engaged with the main lock tooth to be engaged 24A of the main lock engagement portion 24. As a result, the rotation in the drawing-out direction of the spool 12 is restricted (locked), and the drawing-out from the spool 12 of the webbing 14 is restricted. Accordingly, the body of the occupant seated on the vehicle seat is restrained by the webbing 14.

Incidentally, when the solenoid 32 is continuously actuated after completion of engagement of the main lock 22 (main lock engaging tooth 22A) with the main lock engagement portion 24 (main lock tooth to be engaged 24A), it is conceivable that displacement (return) toward the first position P1 of the sensor lever 30 is hindered, and displacement (return) toward the engagement-release position P3 of the pawl 28 is hindered. As a result, it is conceivable that the load on the members constituting the lock mechanism 16 increases and the rotation in the winding direction of the spool 12 is hindered. Thus, in the present embodiment, the control of the solenoid 32 by the controller 50 is as follows.

(Control of Solenoid 32 by Controller 50)

Figure 5:
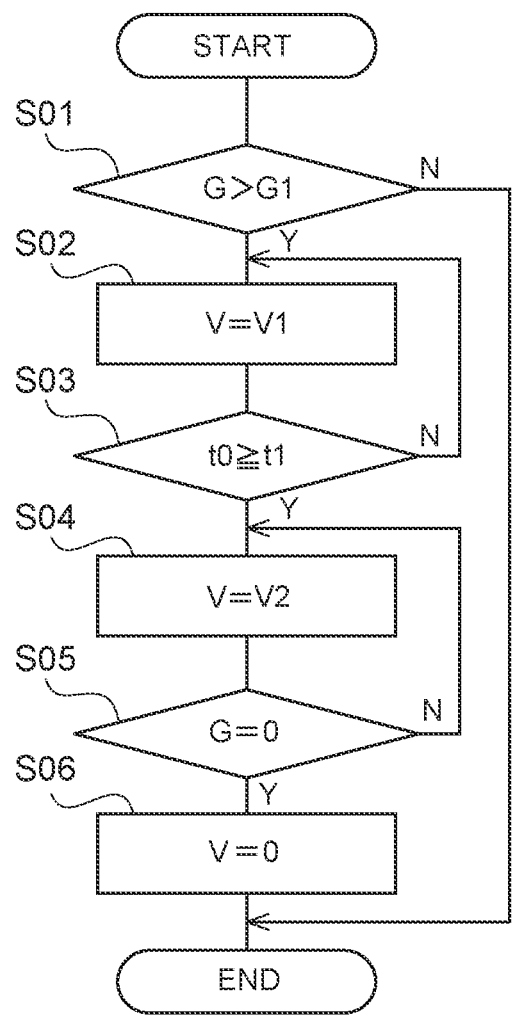
FIG. 5 is a flowchart showing control of a solenoid by a controller.
Figure 6:
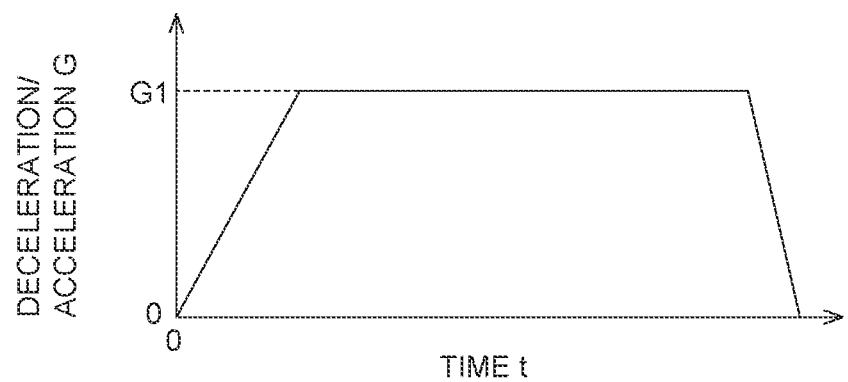
FIG. 6 is a graph showing a relationship between acceleration and time at the time of rapid deceleration of the vehicle detected by the acceleration sensor.
Figure 7:
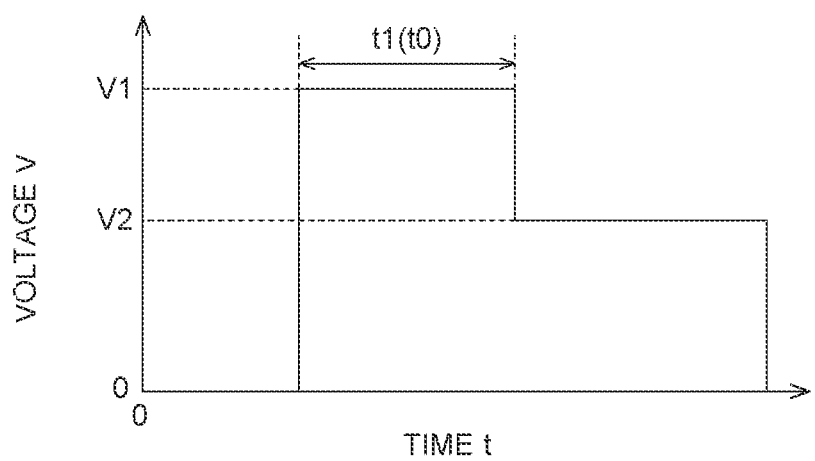
FIG. 7 is a graph showing a relationship between a voltage applied to a solenoid and time at the time of rapid deceleration of the vehicle.

As shown in FIGS. 3, 5, and 6, first, in step S01, the controller 50 determines whether the deceleration/acceleration G of the vehicle including the webbing winding device 10 of the present embodiment exceeds a predetermined deceleration/acceleration G1. If a negative determination is made in step S01, the controller 50 ends the processing and performs the processing in step S01 again.

Figure 8:
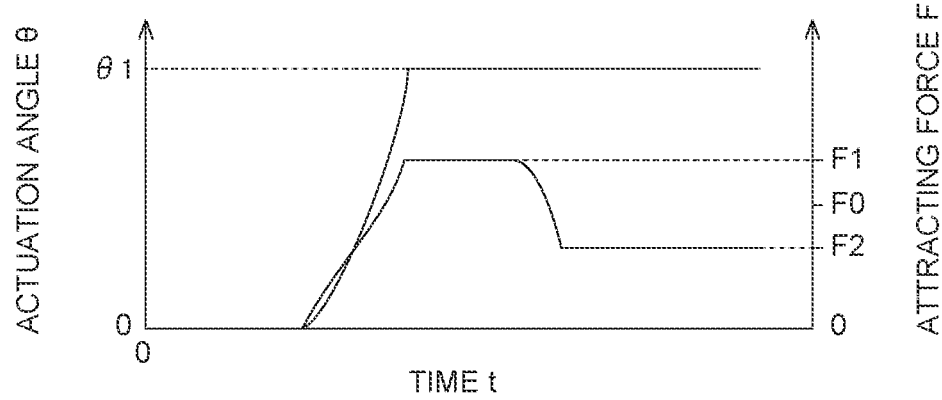
FIG. 8 is a graph showing a relationship between an actuation angle of a sensor lever and time and a relationship between a suction force of the sensor lever by a solenoid and time at the time of rapid deceleration of the vehicle.

As shown in FIGS. 3, 4, 5, 6, and 7, if an affirmative determination is made in step S01, the controller 50 actuates the solenoid 32 by applying a predetermined voltage V1 to the solenoid 32. When the solenoid 32 is actuated, the second arm portion 30E (plate 30F) of the sensor lever 30 is attracted to the solenoid 32 by the attracting force F, and the sensor lever 30 is tilted from the first position P1 to the second position P2. Accordingly, the pawl 28 is tilted from the engagement-release position P3 toward the engaging position P4. Here, as shown in FIGS. 3, 4, and 8, the attracting force F increases as the actuation angle θ goes from 0° toward θ1° until the actuation angle θ of the sensor lever 30 reaches ↓1° corresponding to the second position P2 from 0° corresponding to the first position P1 of the sensor lever 30. Then, in a state where the actuation angle θ of the sensor lever 30 is θ1° and in a state where the voltage V1 is applied to the solenoid 32, the attracting force F is F1. Here, in the present embodiment, the value of the voltage V (V1) applied to the solenoid 32 is set so that the force B1 by which the sensor lever 30 presses the pawl 28 becomes the attracting force F (F1) that exceeds the maximum value of the force B2 by which the pawl 28 returns from the engaging position P4 toward the engagement-release position P3. The force B1 by which the sensor lever 30 presses the pawl 28 is a force generated at the contact point between the sensor lever 30 and the pawl 28, the force being obtained by subtracting the force accompanying the urging of the sensor lever 30 toward the first position P1 by the return spring 36 from the attracting force F by which the sensor lever is attracted by the solenoid 32. The maximum value of the force B2 by which the pawl 28 attempts to return from the engaging position P4 toward the engagement-release position P3 is the maximum value of the force B2 generated at the contact point between the sensor lever 30 and the pawl 28 along with the fact that the spool 12 is rotationally urged in the winding direction by the urging force of the spiral spring or the like. In the present embodiment, the voltage V1 applied to the solenoid 32 is the maximum voltage that can be applied by the controller 50 of the present embodiment.

Next, as shown in FIGS. 3, 4, 5, 7, and 8, the controller 50 determines whether the time to during which the voltage V1 is applied to the solenoid 32 in step S03 has elapsed a predetermined time t1. If a negative determination is made in step S03, the controller 50 continuously applies the voltage V1 to the solenoid 32. Here, the predetermined time t1 is an estimated time from the start of applying the predetermined voltage V1 to the solenoid 32 until the start of locking of the rotation of the spool 12 in the drawing-out direction. That is, the predetermined time t1 is an estimated time from the start of the application of the predetermined voltage V1 to the solenoid 32 until the completion of the engagement of the main lock engaging tooth 22A of the main lock 22 with the main lock tooth to be engaged 24A of the main lock engagement portion 24. The time t1 is determined by various experiments and simulations.

If an affirmative determination is made in step S03, the controller 50 switches the applied voltage V to the solenoid 32 from V1 to V2 in step S04. Here, the applied voltage V2 is set to a voltage smaller than the applied voltage V1. As a result, the attracting force F by which the solenoid 32 attracts the sensor lever 30 is reduced from F1 to F2. Here, in the present embodiment, the value of the applied voltage V (V2) to the solenoid 32 is set so that the force B1 by which the sensor lever 30 presses the pawl 28 becomes the attracting force F (F2) that falls below the maximum value of the force B2 by which the pawl 28 attempts to return from the engaging position P4 toward the engagement-release position P3. In the present embodiment, the applied voltage V2 to the solenoid 32 is a voltage of about 60% of the maximum possible voltage in the controller 50 of the present embodiment. The attracting force F0 shown in FIG. 8 is the attracting force F when the force B1 by which the sensor lever 30 presses the pawl 28 and the maximum value of the force B2 by which the pawl 28 attempts to return from the engaging position P4 toward the engagement-release position P3 become the same force.

Next, as shown in FIGS. 3, 4, 5, 6, and 7, the controller 50 determines whether the deceleration/acceleration G of the vehicle is 0 in step S05. If a negative determination is made in step S05, the controller 50 continuously applies the voltage V2 to the solenoid 32.

If an affirmative determination is made in step S05, the controller 50 stops the actuation of the solenoid 32 by setting the applied voltage V to the solenoid 32 to 0 in step S06, and ends the processing.

With the control by the controller 50 described above, it is possible to quickly lock the rotation in the drawing-out direction of the spool 12 at the time of rapid deceleration of the vehicle. After the rotation in the drawing-out direction of the spool 12 is locked, it is possible to reduce the extra power consumed by the solenoid 32 by reducing the applied voltage V to the solenoid 32 from V1 to V2. Even after the applied voltage V to the solenoid 32 is reduced from V1 to V2, the sensor lever 30 can be continuously urged toward the second position P2.

After the applied voltage V to the solenoid 32 is reduced from V1 to V2, the force B1 by which the sensor lever 30 presses the pawl 28 is the attracting force F (F2) that falls below the maximum value of the force B2 by which the pawl 28 attempts to return from the engaging position P4 toward the engagement-release position P3. Accordingly, when an excessive force such that the pawl 28 attempts to return from the engaging position P4 toward the engagement-release position P3 is input to the pawl 28, it is possible to prevent the actuation force F of the solenoid 32 from hindering the displacement (return) of the pawl 28 and the sensor lever 30 respectively toward the engagement-release position P3 and the first position P1.

In the example described above, an example is described in which it is determined whether the time t0 during which the voltage V1 is applied to the solenoid 32 has elapsed the predetermined time t1, and the applied voltage V to the solenoid 32 is switched from V1 to V2, but the present invention is not limited to this. For example, the applied voltage V to the solenoid 32 may be switched from V1 to V2 by determining whether the lock of the rotation in the drawing-out direction of the spool 12 is started based on a signal from the sensor.

Although one embodiment of the present invention has been described above, the present invention is not limited to the above, and it is needless to say that various modifications other than the above can be made and implemented without departing from the gist of the present invention.

The disclosure of Japanese Patent Application No. 2020-056844 filed on Mar. 26, 2020 is incorporated herein by reference in its entirety.

The invention claimed is:

1. A webbing winding device comprising:
   a spool, a webbing to be attached to an occupant being wound around the spool, and the spool being rotated in a drawing-out direction by the webbing being drawn out;
   a displacement member configured to be displaced between a first position and a second position, rotation in the drawing-out direction of the spool being enabled in a state in which the displacement member is disposed at the first position, and rotation in the drawing-out direction of the spool being locked in a state in which the displacement member is disposed at the second position;
   an actuation portion, actuation of the actuation portion causing a part of the displacement member to be attracted to cause the displacement member to be displaced from the first position to the second position; and
   a controller configured to adjust an attracting force by which the actuation portion attracts the part of the displacement member, the controller configured to adjust the attracting force after completion of displacement to the second position of the displacement member to an attracting force that is weaker than an attracting force at a time of completion of displacement to the second position of the displacement member,
   wherein the actuation portion is configured to generate a magnetic field in response to the application of a voltage thereto, and to attract the part of the displacement member by the magnetic field, and
   wherein the controller adjusts the attracting force by which the actuation portion attracts the part of the displacement member by controlling the voltage applied to the actuation portion.

2. The webbing winding device according to claim 1, further comprising a main lock that is displaced after completion of displacement to the second position of the displacement member, thereby causing locking of rotation in the drawing-out direction of the spool to be started, and wherein, after start of locking of rotation in the drawing-out direction of the spool, the controller adjusts the attracting force to an attracting force that is weaker than an attracting force at a time of completion of displacement to the second position of the displacement member.

3. The webbing winding device according to claim 1, further comprising a pawl that, by the displacement member being displaced from the first position to the second position, is pressed by the displacement member and displaced from an engagement-release position to an engaging position, wherein at a time of completion of displacement to the second position of the displacement member, the controller adjusts the attracting force so that a force by which the displacement member presses the pawl exceeds a maximum value of a force by which the pawl attempts to return from the engaging position toward the engagement-release position, and wherein after completion of displacement to the second position of the displacement member, the controller adjusts the attracting force so that the force by which the displacement member presses the pawl falls below the maximum value of the force by which the pawl attempts to return from the engaging position toward the engagement-release position.

* * * * *